United States Patent [19]
Ehle et al.

[11] Patent Number: 5,680,024
[45] Date of Patent: Oct. 21, 1997

[54] VEHICLE SPEED CONTROL WITH ADAPTIVE COMPLIANCE COMPENSATION

[75] Inventors: David Lynn Ehle, Attica; Lisa Marie Unuvar, Flint; Daniel Alexander Crawford, Burton; Timothy Lee Budzier, Davison; Susan Jean Lane, Clarkston, all of Mich.

[73] Assignee: General Motors Corporation, Detroit, Mich.

[21] Appl. No.: 657,374

[22] Filed: Jun. 3, 1996

[51] Int. Cl.⁶ ............................................. B60K 31/04
[52] U.S. Cl. ...................... 318/632; 123/361; 180/178
[58] Field of Search ............................. 318/560, 618, 318/632, 685; 123/349, 350, 352, 361; 18/178, 179; 364/426.031, 426.041

[56] References Cited

U.S. PATENT DOCUMENTS

| | | | |
|---|---|---|---|
| 4,134,373 | 1/1979 | Kibler et al. | 123/102 |
| 4,217,867 | 8/1980 | Madsen et al. | 123/350 |
| 4,684,866 | 8/1987 | Nehmer et al. | 318/696 |
| 4,850,250 | 7/1989 | Nehmer et al. | 74/857 |
| 4,928,780 | 5/1990 | Tada | 18/179 |
| 5,014,806 | 5/1991 | Hamada . | |
| 5,119,899 | 6/1992 | Johnson et al. | 180/177 |
| 5,524,724 | 6/1996 | Nishigaki et al. | 180/176 |

*Primary Examiner*—Bentsu Ro
*Attorney, Agent, or Firm*—Robert M. Sigler

[57] ABSTRACT

A vehicle speed control system provides adaptive compensation for compliance in a linking mechanism between a throttle control member and a throttle which creates hysteresis in throttle movement. The system has a vehicle speed sensor, an actuator having an output linked to the throttle control member, an actuator position signal generator and a control responsive to the vehicle speed sensor and the actuator position signal generator for positioning the actuator in closed loop control with a major loop in response to vehicle speed and a minor loop in response to actuator position. The control repeatedly determines when vehicle speed is not within a predetermined range and responds (1) deriving a desired actuator position signal, a present actuator position signal and a position error signal from the difference therebetween, (2) deriving an output position signal from the desired actuator position signal when the position error signal is not zero, (3) modifying the output position signal by a compliance compensation value for actuator movement in a first direction, and (4) activating the actuator to a position corresponding to the output position signal. The control further accumulates the second and subsequent position error signals for actuator movement in the first direction as an accumulated difference value and, when actuator movement is initiated in a second direction, updates the compliance compensation value as a predetermined percentage of the sum of the compliance compensation value and the accumulated difference value.

7 Claims, 12 Drawing Sheets

VEHICLE SPEED CONTROL WITH ADAPTIVE COMPLIANCE COMPENSATION

BACKGROUND OF THE INVENTION

The technical field of this invention is vehicle speed controls which actuate the throttle valve of a vehicle engine to maintain vehicle speed essentially constant at a value set by the vehicle operator.

In some vehicle speed controls, the control actuator acts on a throttle control member which is separated from the throttle itself by a linking mechanism having considerable compliance due to bushings and other spring-like mounting or connecting members together with friction between certain parts of the linking mechanism. The compliance of the linking mechanism generates a hysteresis in movements of the throttle valve in response to movements of the throttle control member.

Figure 2:
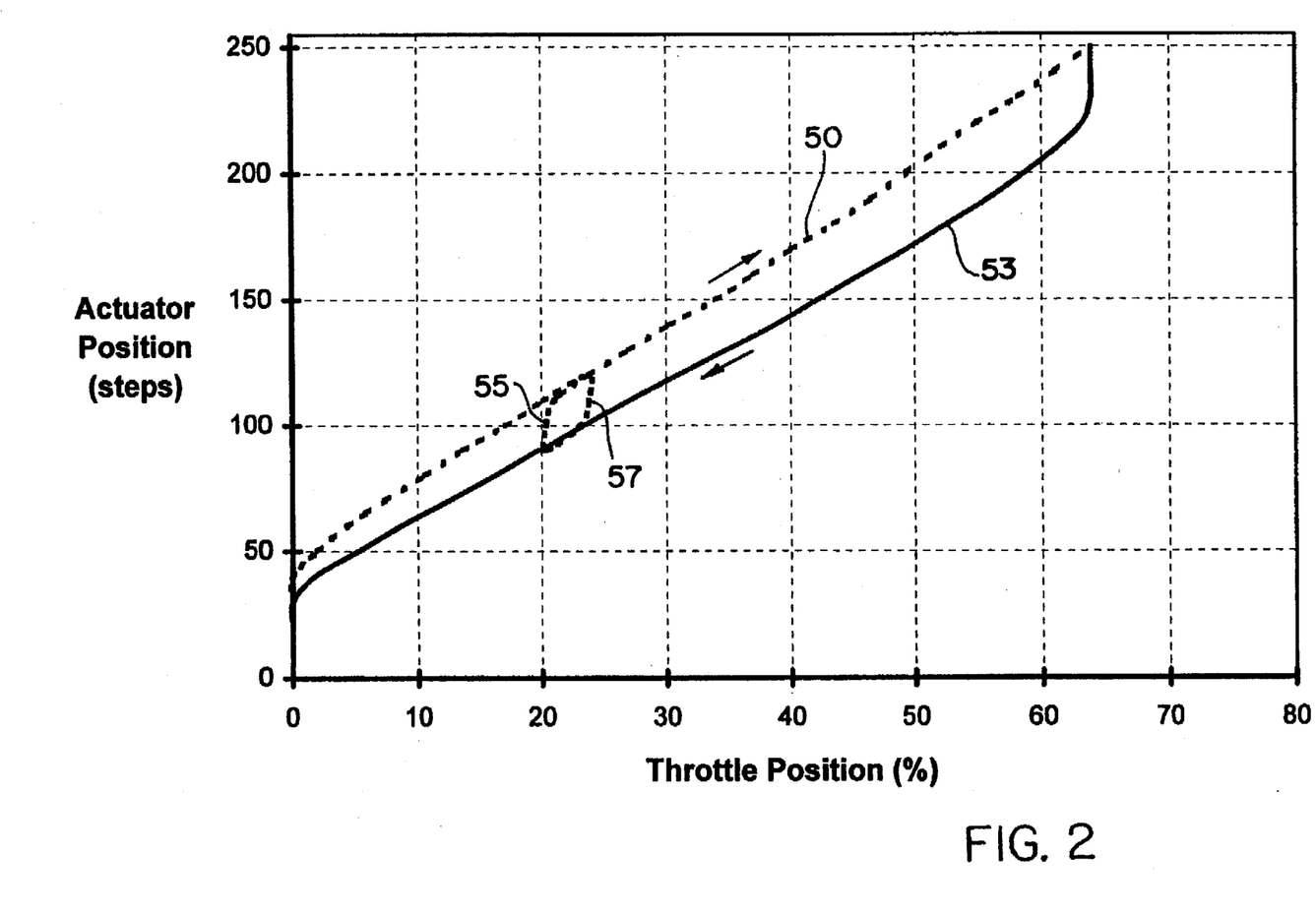
FIG. 2 is a graph of throttle position as a function of actuator position in the vehicle of FIG. 1.
Figure 4A:
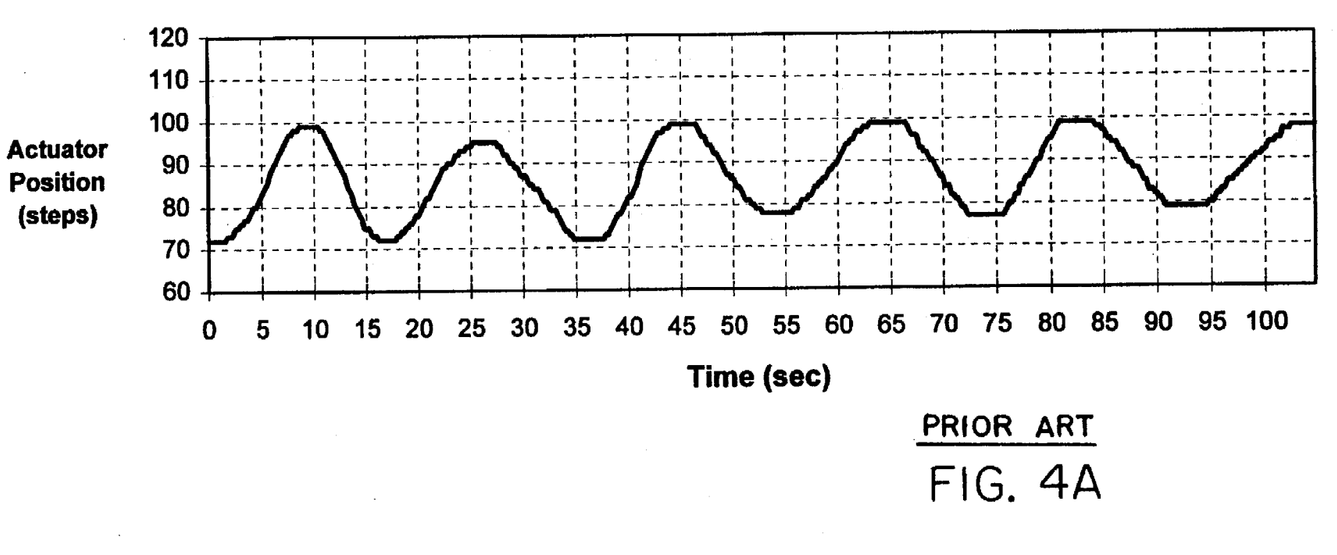
FIG. 4A, 4B and 4C show time waveforms of actuator position, throttle position and vehicle speed for the vehicle of FIG. 1 with a speed control of the prior art.
Figure 4B:
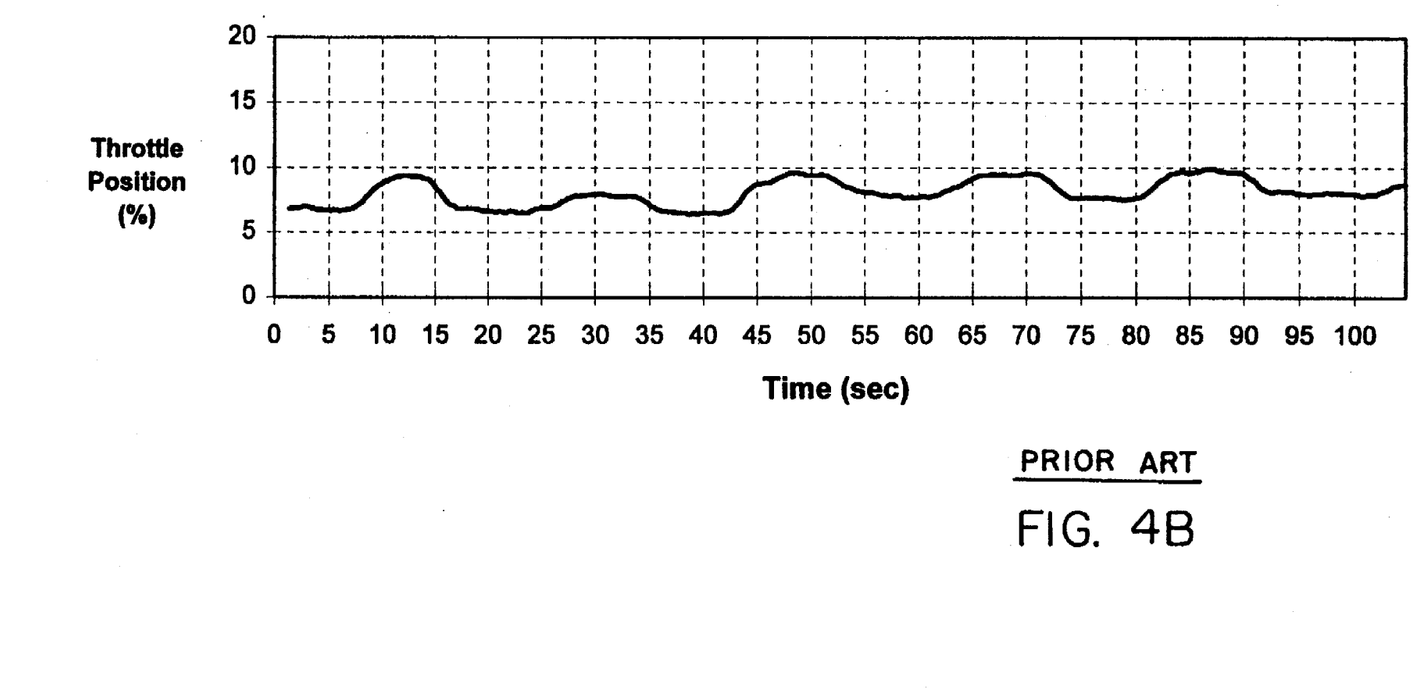
Figure 4C:
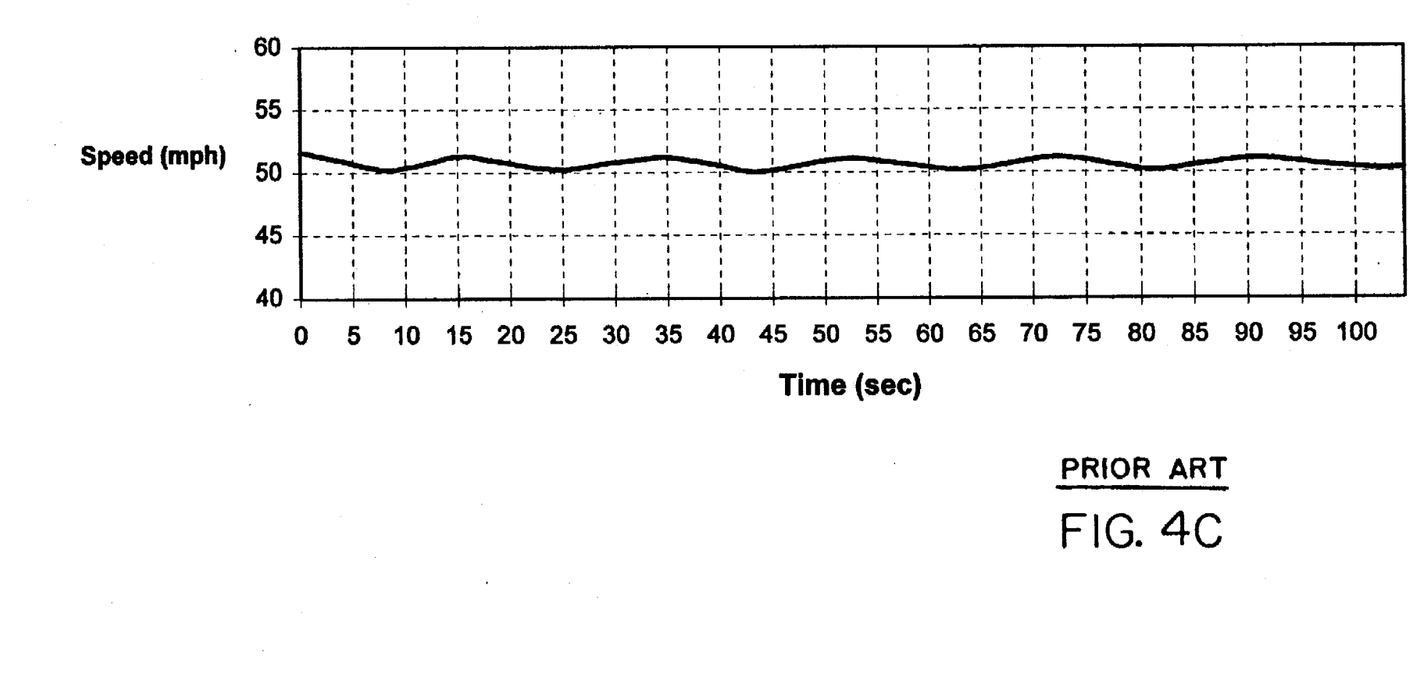

Such hysteresis can be seen in FIG. 2, which shows throttle position on the horizontal axis as a function of actuator position on the vertical axis. When the actuator is moving the throttle in a direction to increase vehicle speed, the relationship is shown in the upper, dashed line 50. Conversely, when the actuator is moving the throttle in the opposite direction to decrease vehicle speed, the relationship is shown by the lower, solid line 53. When the actuator reverses its direction of movement from speed increasing to speed decreasing or vice versa, there is a significant lag in throttle movement as the compliance of the linking mechanism is taken up and the operating point shifts vertically up or down from one of lines 50 and 53 to the other. With a typical vehicle speed control of the prior art, this lag can produce a cycling in operation, as the system operating point moves in a four sided figure in FIG. 2: up line 55, across line 50, down line 57 and across line 53 to the bottom of line 57, from which the cycle repeats. Measured results are shown in the plots of FIG. 4A–4C, which show the cycling in a throttle actuator, the throttle itself and vehicle speed, respectively, over a time period of 100 seconds in which the system is attempting to maintain a constant vehicle speed. The cycling in vehicle speed can be annoying to the vehicle operator and passengers.

SUMMARY OF THE INVENTION

The vehicle speed control system of this invention provides an adaptive compensation for compliance of a mechanism linking a throttle control member to a throttle as the throttle control member is positioned by an actuator in response to the control in closed loop operation. It comprises a vehicle speed sensor, an actuator having an output linked to the throttle control member, an actuator position signal generator and a control responsive to the vehicle speed sensor and the actuator position signal generator for positioning the actuator in closed loop control with a major loop in response to vehicle speed and a minor loop in response to actuator position.

The control repeatedly determines when vehicle speed is not within a predetermined range and responds (1) deriving a desired actuator position signal, a present actuator position signal and a position error signal from the difference therebetween, (2) deriving an output position signal from the desired actuator position signal when the position error signal is not zero, (3) modifying the output position signal by a compliance compensation value for actuator movement in a first direction, and (4) activating the actuator to a position corresponding to the output position signal. The control further accumulates the second and subsequent position error signals for actuator movement in the first direction as an accumulated difference value and, when actuator movement is initiated in a second direction, updates the compliance compensation value as a predetermined percentage of the sum of the compliance compensation value and the accumulated difference value.

The vehicle speed control system of this invention thus reduces cycling in the vehicle speed due to compliance in a throttle mechanism and automatically adapts to changes in the compliance.

DESCRIPTION OF A PREFERRED EMBODIMENT

Figure 1:
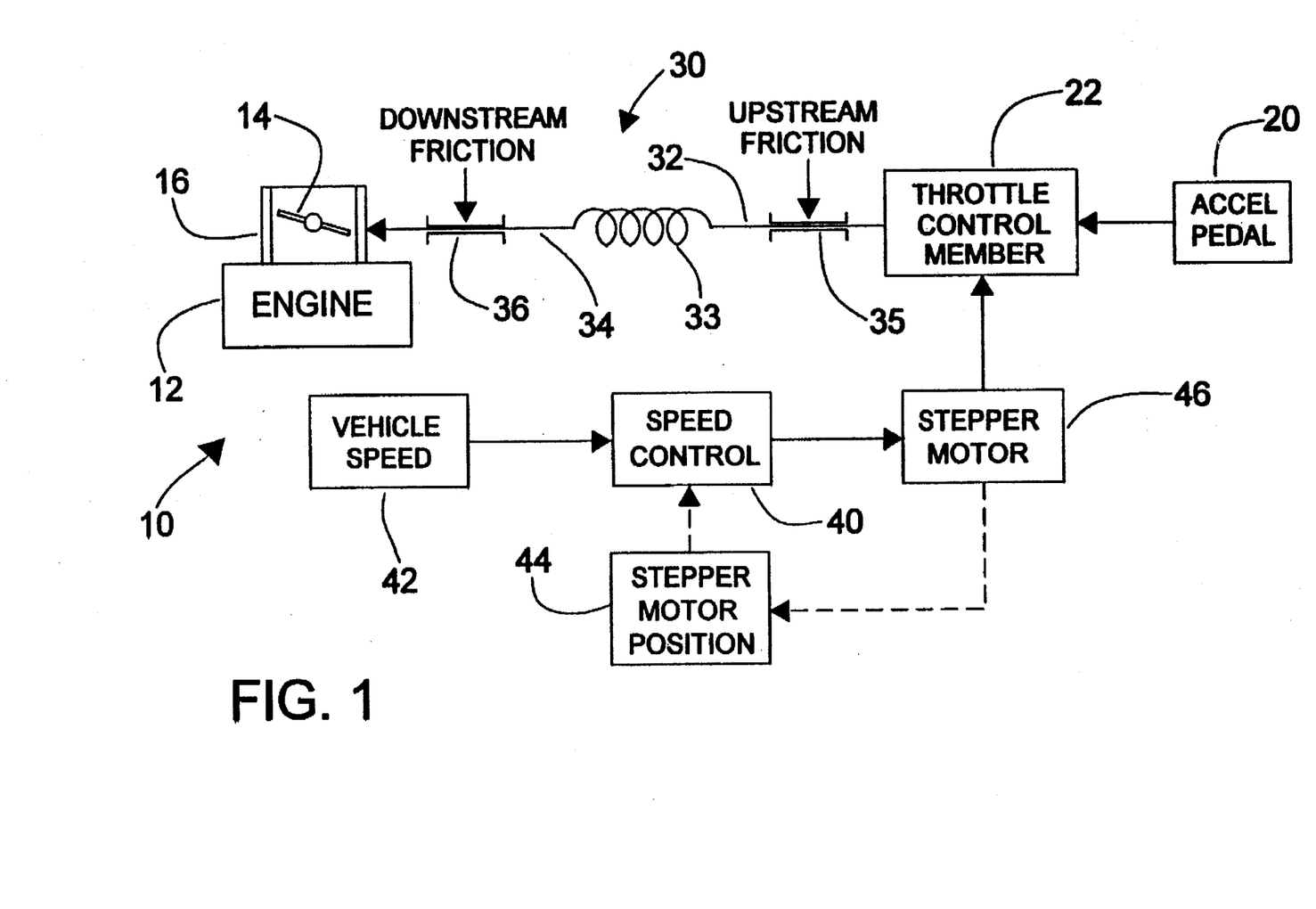
FIG. 1 is a block diagram of a vehicle having a vehicle speed control and having compliance between a throttle control member and throttle.

Referring to FIG. 1, a motor vehicle 10 has an engine 12 with a throttle 14 in a throttle body 16 to control the rate of combustible mixture supplied to engine 12 in the normal manner. An accelerator pedal 20 is connected in a conventional manner to a throttle control member 22, which is connected through a linking mechanism 30 to throttle 14. The operator opens throttle 14 by activating accelerator pedal 20; and a standard throttle return spring, not shown, closes throttle 14 when the vehicle operator releases throttle pedal 20.

Linking mechanism 30 is shown functionally in FIG. 1. It may be represented in simplified form by an upstream portion 32 connected through a compliance spring 33 to a downstream portion 34. Compliance spring 33 represents the most significant spring-like portions of mechanism 30, such as mounting bushings for lever pivots and/or bushings between throttle activating members to reduce shock to the throttle from sudden, full movements of throttle pedal 20. In addition, an upstream member 35 produces an upstream friction retarding movement of upstream portion 32; and a downstream member 36 produces a downstream friction retarding movement of downstream portion 34. The upstream friction and downstream friction are typically between cables, which are part of upstream portion 32 and downstream portion 34, and their surrounding, protective coverings or sheaths, the latter being examples of upstream member 35 and downstream member 36.

In operation, when throttle control member 22 pulls on upstream portion 32 to open throttle 14, the down stream friction produced by downstream member 36 on downstream portion 34 resists movement of the latter; and compliance spring 33 expands until it generates sufficient force to overcome the downstream friction and move downstream portion 34. Only with movement of the latter does throttle 14 start opening; and this is after throttle control member 22 has moved significantly. The expansion of compliance spring 33, with throttle control member 22 moving and throttle 14 stationary, results in the vertical line 55 in FIG. 2; and subsequent opening movement of throttle 14 is along line 50.

When throttle control member 22 moves in a direction to allow closure of throttle 14, the upstream friction and downstream friction, when added to the force of the extended compliance spring 33, prevent the throttle return spring from immediately moving throttle 14 toward its closed position. It is necessary for throttle control member 22 to move sufficiently that compliance spring 33 reduces its tension before throttle 14 can be moved toward its closed position by the throttle return spring. This movement of throttle control member 22 in the closing direction with no corresponding movement of throttle 14 results in line 57 of FIG. 2; and the subsequent closing movement of throttle 14 is along line 53. The lag in movement of throttle 14 in both directions in response to movement of throttle control member 22, due to the compliance and friction in linking mechanism 30, produces the hysteresis in the system.

A vehicle speed control 40, of the type popularly known as a cruise control, receives a signal from a vehicle speed sensor 42 and a stepper motor position indicator 44. Speed control 40 generates signals to position an actuator 46, in this embodiment a stepper motor, which actuates throttle control member 22 with negligible compliance. Thus, speed control 40 is capable of accurately positioning throttle control member 22 in response to a signal $N_v$ from vehicle speed sensor 42, a step signal from stepper motor movement sensor 44 and an internal closed loop control program running on a digital computer. Alternatively, stepper motor 46 could be replaced by any other suitable motor or electromechanical positioning device with stepper motor movement sensor 44 replaced by a conventional position sensor.

An example of a control suitable for modification according to this invention is shown in U.S. Pat. No. 4,684,866, issued to Nehmer et al on Aug. 4, 1987 and U.S. Pat. No. 4,850,250, issued to Nehmer et al on Jul. 25, 1989. The control of these prior art patents is a computer based, closed loop control having a major or outer loop responsive to vehicle speed and a minor or inner loop responsive to stepper motor position. As described in U.S. Pat. No. 4,684,866, the control reads vehicle speed and other appropriate inputs and uses an algorithm, which may be conventional, to determine a desired stepper motor position based, at least in part, on the magnitude and direction of vehicle speed error and previously determined empirical relationships between throttle position and vehicle acceleration torque. This is the major or outer loop, which is accomplished in a main or background program described in FIG. 8 of U.S. Pat. No. 4,684,866. The minor loop, accomplished in a timer based interrupt routine shown in FIG. 9–14 of U.S. Pat. No. 4,684,866, is a motor control routine which loops at a much faster repetition rate to activate the stepper motor to the desired position and thus comprises the minor or inner loop. In the vehicle and control of U.S. Pat. No. 4,684,866, the stepper motor is linked to the vehicle throttle through a clutch and gear assembly and a short, direct linkage having negligible compliance. In the vehicle and control of that patent, there is thus a one-to-one relationship, with no hysteresis, between the position of the stepper motor and that of the throttle when the control is actively controlling. In the vehicle and control of this specification, however, the hysteresis due to compliance in mechanism 30 joining throttle control member 22 and throttle 14 eliminates the one-to-one relationship between the position of stepper motor 46 (with throttle control member 22) and throttle 14, so that the position of throttle 14 is a function of both the position of throttle control member 22 and its direction of movement. Thus, this invention modifies the major loop of the control in the above-identified patent to determine and pass to the minor loop a desired motor position which is compensated for the compliance.

Figure 3:
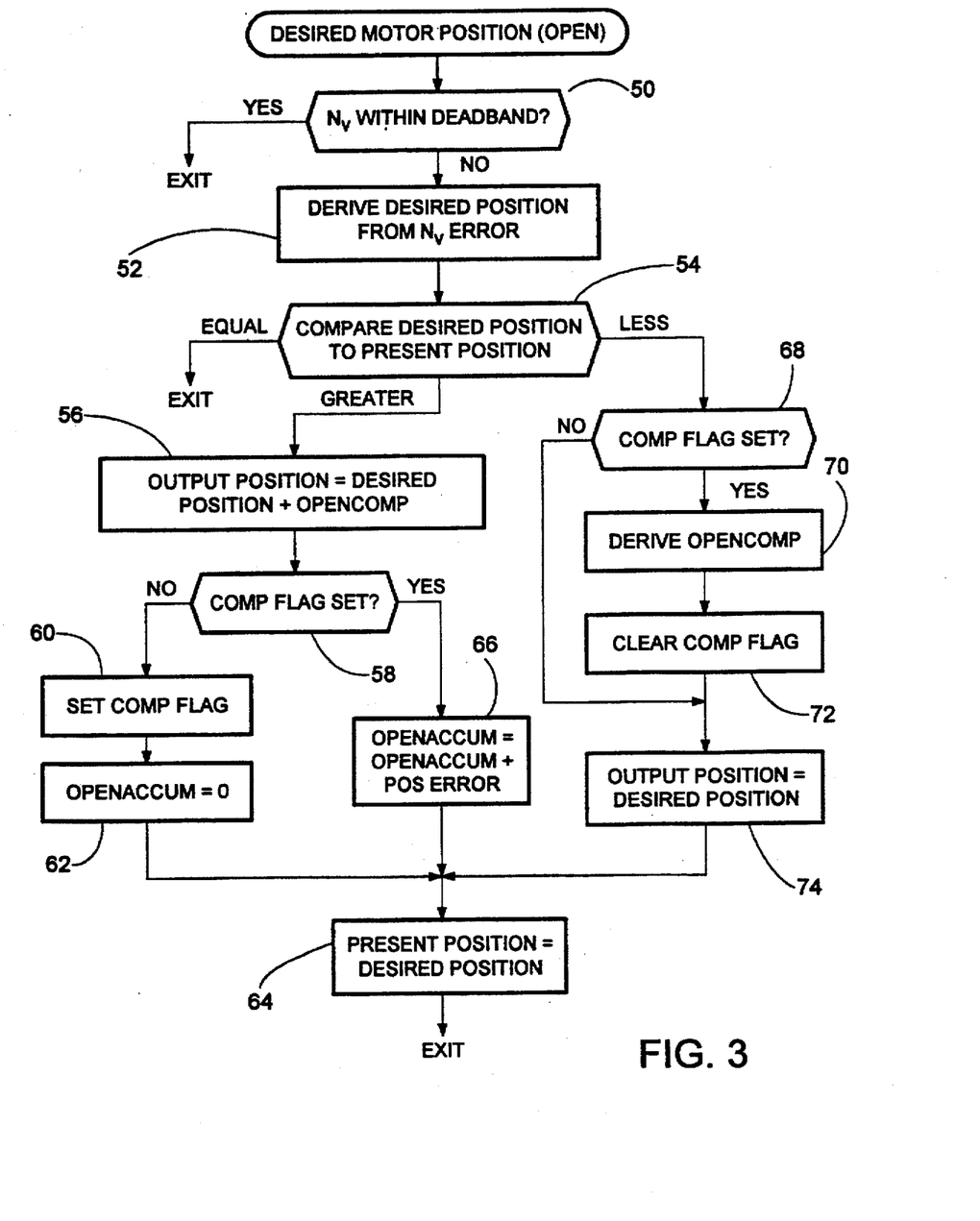
FIG. 3 is a flow chart illustrating the operation of a preferred embodiment of the speed control of this invention in the vehicle of FIG. 1.

The modified portion of speed control 40 is shown by the flow chart of FIG. 3. This routine is preferably a portion of that within block 210, FIG. 8, of U.S. Pat. No. 4,684,866, in which a desired motor position is determined from predetermined inputs, especially vehicle speed $N_v$. There exist a number of equivalent ways of setting up this routine, which differ in certain programming details according to the assignment of a reference motor position curve. This assignment is arbitrary and may be made by the programmer for convenience in programming. The flow chart of FIG. 3 shows a preferred arrangement, in which the reference position curve is assigned as the actual motor position when moving in the throttle closing direction (along curve 53 in FIG. 2); and the motor position must therefore be compensated when moving in the throttle opening direction (along curve 50). Since compensation is performed only in the throttle opening direction, the routine is named DESIRED MOTOR POSITION (OPEN).

Referring to FIG. 3 of this specification, the routine begins at 50 by determining whether the input vehicle speed $N_v$ is within a predetermined deadband value of a stored vehicle speed reference value, which may be set by the vehicle operator as a desired vehicle speed. If it is within the deadband, no vehicle speed error exists; and the routine is exited without change in the position of stepper motor 46. However, if $N_v$ is not within the deadband value of the stored vehicle speed reference, a vehicle speed error exists; and a new DESIRED POSITION of stepper motor 46 is derived at 52 from the vehicle speed error according to any suitable control algorithm, of which many are known in the art.

The newly derived DESIRED POSITION of stepper motor 46 is compared at 54 with a PRESENT POSITION of stepper motor 46. The PRESENT POSITION is an uncompensated position which represents the previous value of the desired motor position, preferably expressed as the number of motor steps in the throttle opening direction from a reference motor position representing a fully closed throttle if there were no compliance between stepper motor 46 and throttle 14. If the DESIRED POSITION equals the PRESENT POSITION, there is no position error; and the routine is exited.

If the DESIRED POSITION is greater at 54 than the PRESENT POSITION, stepper motor 46 must be activated in the throttle opening direction. However, in this direction, it is necessary to compensate for hysteresis. Therefore, at 56, a compensated OUTPUT POSITION is calculated by adding a compliance compensation value OPENCOMP to the DESIRED POSITION:

OUTPUT POSITION=DESIRED POSITION+OPENCOMP.

Next, a COMP flag is checked at 58. This flag will not be found set on the first check after a change in motor direction from the throttle closing direction to the throttle opening direction. If this is the case, the COMP flag is set at 60 and a quantity OPENACCUM is set to zero at 62. The PRESENT POSITION is then set equal to the DESIRED POSITION at 64:

PRESENT POSITION=DESIRED POSITION.

Thus, a new, compensated OUTPUT POSITION for the stepper motor has been calculated and is stored for use as the desired motor position M-POS-DES in the motor control routine of U.S. Pat. No. 4,684,866; and the PRESENT POSITION has been updated to the DESIRED POSITION to prepare for the next loop of the routine. At this point the routine is exited; and the motor control routine, which may be triggered by a timer interrupt many times before the next loop of FIG. 3, provides pulses to move the stepper motor to position M-POS-DES (the OUTPUT POSITION of this flow chart). As will be seen at a later point in this description, the compliance compensation value OPENCOMP is derived in such a manner that it does not fully compensate for the compliance, but leaves stepper motor 46 slightly short of a fully compensated position. In most cases, therefore, another pass through the routine with motor movement in the same direction will follow the first.

On the next and subsequent passes through the routine until the direction of throttle movement changes from opening to closing, the COMP flag will be found set at 58. When this is the case, before proceeding to set the REFERENCE POSITION equal to the DESIRED POSITION at 64 and exit, the routine increases the previously zeroed quantity OPENACCUM by the newly calculated position error, if any, at 66:

OPENACCUM=OPENACCUM+POS ERROR, where POS ERROR equals the DESIRED POSITION less the PRESENT POSITION as determined at 54:

POS ERROR=DES POSITION−PRESENT POSITION.

Thus, when it is necessary to open throttle 14, a compliance compensation value OPENCOMP is added to the DESIRED POSITION to create a compensated OUTPUT POSITION to be passed to the motor control routine as the working desired stepper motor position in the minor loop, with the extra steps produced by OPENCOMP activating stepper motor 46 further to mostly compensate for the compliance between throttle control member 22, which moves essentially with stepper motor 46, and throttle 14. The motor control routine loops at a repetition rate many times that of the routine DESIRED MOTOR POSITION of FIG. 3 and, in those generally steady state modes of vehicle operation typical of vehicle speed control operation, the motor control routine will activate the stepper motor, step by step, to the OUTPUT POSITION and thus open the throttle as commanded before the next loop through the flow chart of FIG. 3. If a vehicle speed error or position error in the same direction exists on the next loop of the flow chart of FIG. 3—that is, on the second pass through the routine with stepper motor 46 having been activated to a new OUTPUT POSITION in the throttle opening direction—it is assumed that the compliance compensation value OPENCOMP is too small to produce the required compensation. Thus, the stepper motor is further activated on the second and subsequent loops until the PRESENT POSITION equals the DESIRED POSITION; and the additional motor steps by which the desired motor position is increased in the second and subsequent passes through the routine are accumulated in the value OPENACCUM, which was zeroed in the first pass through the routine, and will be used, when the stepper motor is finally reversed to the throttle closing direction, to adaptively update the compliance compensation value OPENCOMP.

Once the opening of throttle 14 has brought vehicle speed back within the deadband, the routine will not be traversed beyond step 50 of the flow chart while throttle 14 is maintained in the DESIRED POSITION. It is possible that, before the throttle is eventually moved in the closing direction, a further increase in throttle opening will be required due to an increase in grade of the road or an operator initiated increase in the speed reference. In this case, one or more additional loops of the flow chart will take place as described above for subsequent loops, with the COMP FLAG still set and any additional position errors thus accumulated in the quantity OPENACCUM. Digital filtering of the OPENACCUM value may be used to average the effects of road changes or driver input changes on the compliance compensation value.

However, when vehicle speed $N_v$ moves out of the deadband on the high side, so that it needs to be reduced, the newly derived DESIRED POSITION will be found to be less than the PRESENT POSITION at 54. The COMP FLAG is then checked at 68; and, if the last throttle movement was in the opening direction, the flag will be found set. If so, a new value of the compliance compensation value OPENCOMP is derived at 70 as a predetermined portion of the sum of the old value and the accumulated position error OPENACCUM:

OPENCOMP=K*(OPENCOMP+OPENACCUM), where K is a proportionality constant typically between 70 and 90 percent (0.7 to 0.9), preferably 0.8. The choice of the value of K depends on the power to weight ratio of the vehicle for which the compensation is applied and the calibration of the engine and transmission. OPENACCUM represents the accumulated total number of steps, over and above the old value of OPENCOMP and the derived position errors, that were required to move the stepper motor to its DESIRED POSITION(s) in the throttle opening direction since the last time the throttle was closed, and thus indicates the change in the compliance that must be compensated. However, the new value of OPENCOMP is reduced by factor K to a value somewhat less than the old value plus the accumulated difference so as to prevent overshooting the desired motor position in the throttle opening direction and to allow the updated value to be decreased when necessary. The updated value of OPENCOMP is retained for use when throttle movement in the opening direction is again initiated.

After updating OPENCOMP at 70, the routine resets the COMP FLAG at 72 and, since there is no compensation in the throttle closing direction, sets the OUTPUT POSITION equal to the DESIRED POSITION at 74 before exiting:

OUTPUT POSITION=DES POSITION,

The OUTPUT POSITION is again stored as M-POS-DES for the motor control routine, which moves the stepper motor, step by step, to the newly desired position before the next loop of FIG. 3. In a second and any subsequent loops after throttle movement in the closing direction is initiated, there is no need to repeat steps 70 and 72 of the flow chart; and they are thus skipped when the COMP FLAG is found reset at 68.

Thus, the compliance compensation value OPENCOMP, which is used to compensate the position of the stepper motor in the throttle opening direction, is adaptively updated whenever throttle movement in the closing direction is initiated, with the compensation being a function of the error in OPENCOMP measured during the last throttle opening movement(s). In practice, OPENCOMP is preferably used as the sum of two values stored separately in memory. A first part, which preferably comprises about 50% of a nominal total value, is permanently fixed in non-volatile ROM. This part is used as an initial value when the speed control system is first turned on. The second part is the remainder of the total, which is built up quickly from zero in the normal operation of the system as described above and is stored in RAM as long as the speed control system is operating. It is the second part to which changes in OPENCOMP are made; although the value of OPENCOMP is always the sum of the first, fixed part in ROM and the second, variable part in RAM.

Figure 6:
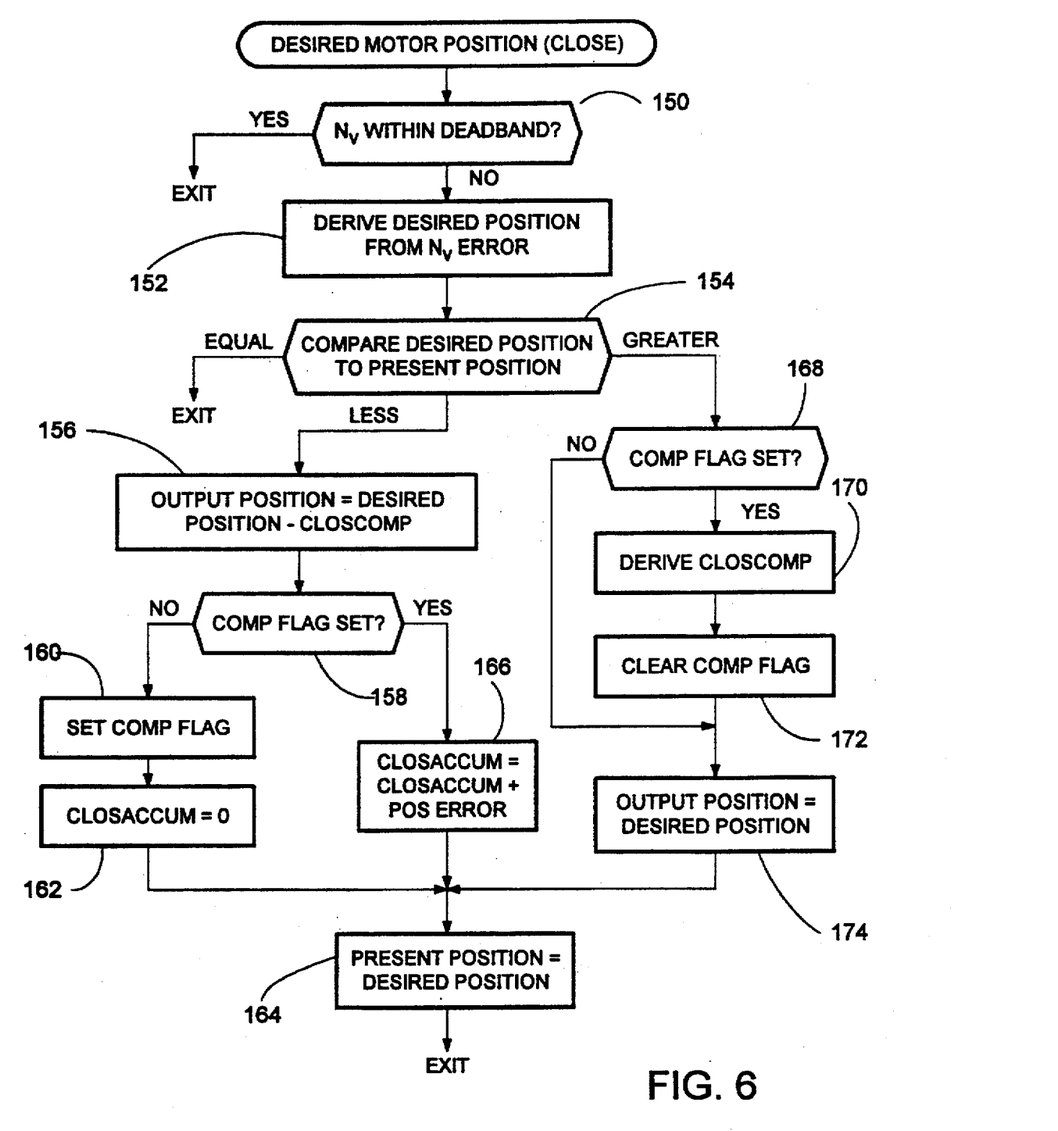
FIG. 6, 7A and 7B are flow charts illustrating the operation of different but equivalent embodiments of the speed control of this invention in the vehicle of FIG. 1.

An embodiment of the invention alternative but equivalent to that described by the flow chart of FIG. 3 is described by the flow chart of FIG. 6. In this embodiment, the uncompensated motor position values are used in the throttle opening direction (along curve 50 in FIG. 2) and the motor position is compensated in the motor closing direction (along curve 53 in FIG. 2), which is the inverse of the relationship used in the flow chart of FIG. 3. The routine is therefore named DESIRED MOTOR POSITION (CLOSE). The flow chart of FIG. 6 is similar in form to that of FIG. 3; and the steps of FIG. 6 are indicated by reference numerals in the range 100–199 having the same last two digits as the corresponding steps of FIG. 3. The compliance compensation value is named CLOSCOMP; and the accumulated difference is named CLOSACCUM, both due to the use of compensation in the throttle closing direction. Otherwise, the differences between the flow charts of FIG. 6 and 3 are the interchange of the LESS and GREATER choices in step 154 with respect to the similar choices in step 54 of FIG. 3 and, in step 156 of FIG. 6, the determination of the OUTPUT POSITION by subtraction (rather than addition) of CLOSCOMP from the DESIRED POSITION. Operation of the flow chart of FIG. 6 is similar to that of the flow chart of FIG. 3; and, for a detailed description of the former, the reader is referred to the description of FIG. 3, with due regard for those changes described above in this paragraph.

Although programming is easiest assigning the reference or uncompensated motor position as the actual motor position in either the throttle opening or throttle closing direction, as described above, the reference motor position is arbitrary and can be assigned as any other convenient value, although motor position must then be compensated in both the throttle opening and throttle closing directions. The flow chart of FIG. 7A and 7B describes the operation of one such embodiment, in which the reference or uncompensated motor position is assigned an intermediate value between the motor positions in the throttle opening and throttle closing directions. Thus, compensation is performed with throttle movement in both directions; and values of OPENCOMP and OPENACCUM are maintained separately and independently from values of CLOSCOMP and CLOSACCUM.

Figure 7A:
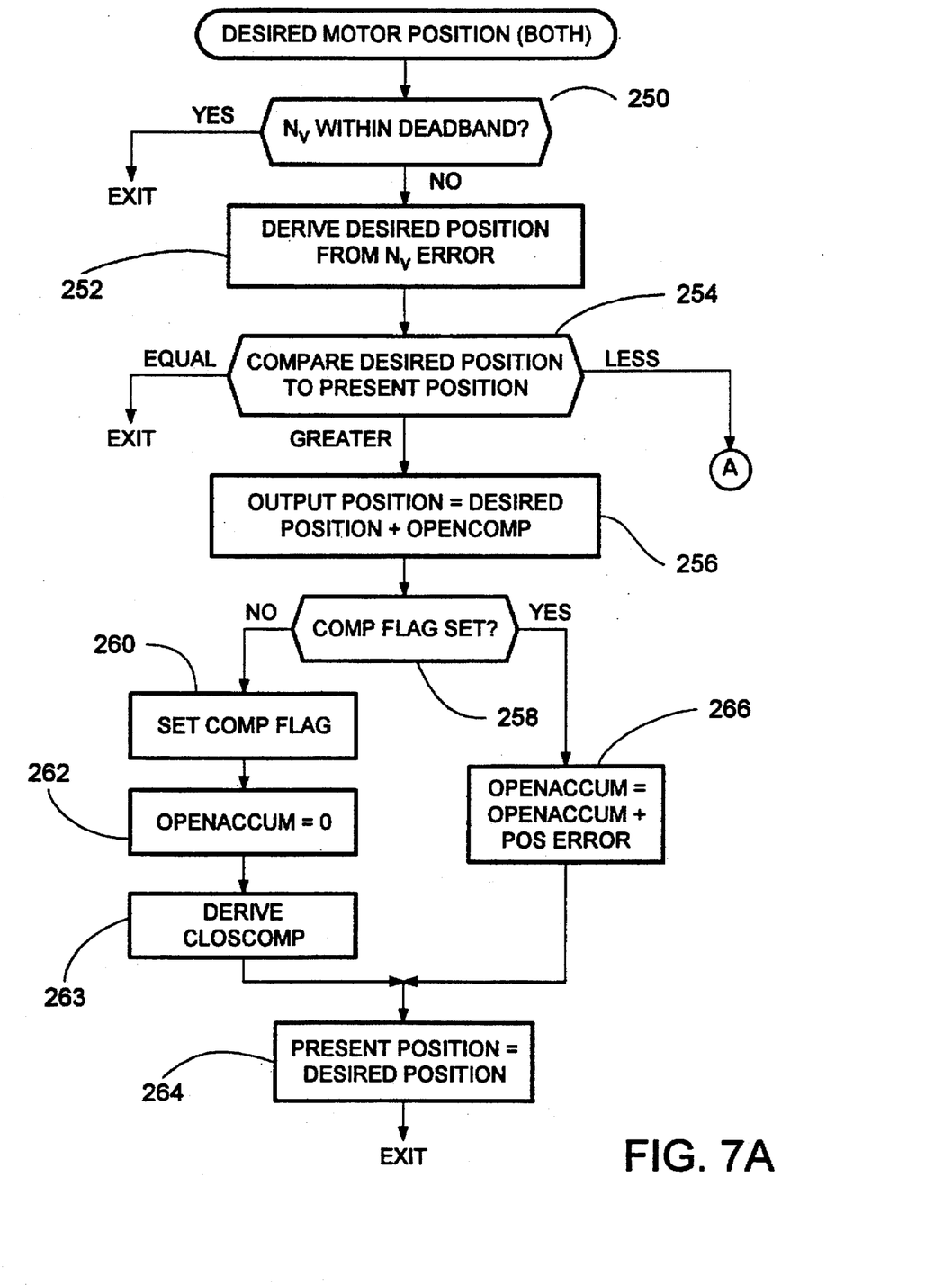

Referring to FIG. 7A, the routine DESIRED MOTOR POSITION (BOTH) starts essentially the same as that of FIG. 3, steps 250, 252 and 254 being identical with corresponding steps 50, 52 and 54 in FIG. 3. What follows is essentially a combination of the remainder of the flow charts of FIG. 3 and 6. If the DESIRED POSITION is greater than the PRESENT POSITION at step 254, the routine proceeds to a portion of the flow chart comprising steps 256–266 which is identical with the similarly numbered portion 56–66 of FIG. 3, except that a step 263 is inserted after step 262. In step 263 the compliance compensation value CLOSCOMP for throttle closing movement is derived in a manner similar to that described with respect to OPENCOMP in step 70 of FIG. 3. Thus, in the first loop after the motor position is determined to be too low and throttle opening is required, when the derived value of OPENCOMP is being used at step 256 to compensate throttle movement in the opening direction and OPENACCUM is initialized in step 262, a new value of CLOSCOMP is derived in preparation for the next change in throttle movement to the throttle closing direction.

Figure 7B:
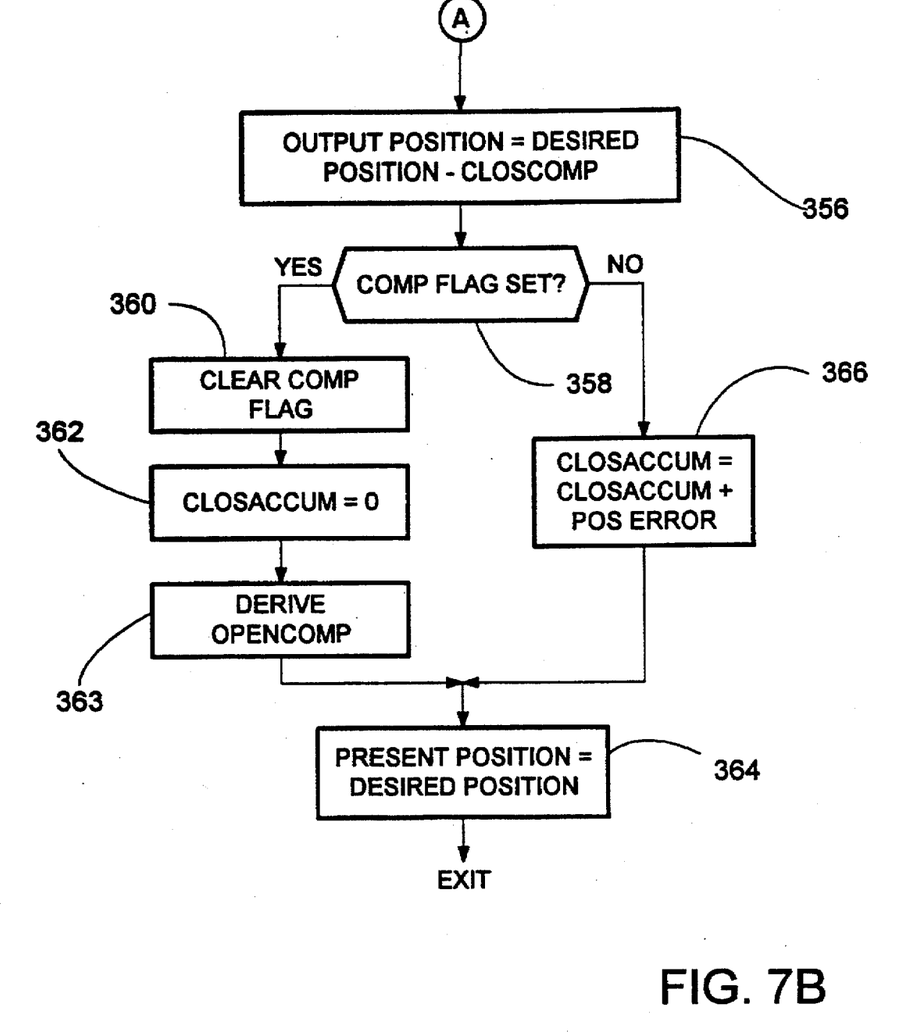

Alternatively, if the DESIRED POSITION is less than the PRESENT POSITION at step 254, the routine proceeds to a portion of the flow chart, seen in FIG. 7B, which comprises steps 356–366 and which is identical with the similarly numbered portion 156–166 of FIG. 6 except that the COMP FLAG state is inverted and the compliance compensation value OPENCOMP is derived in an added step 363. The inversion of the COMP FLAG allows a single flag to be used to indicate the initial loop in both throttle opening and closing directions.

Figure 5A:
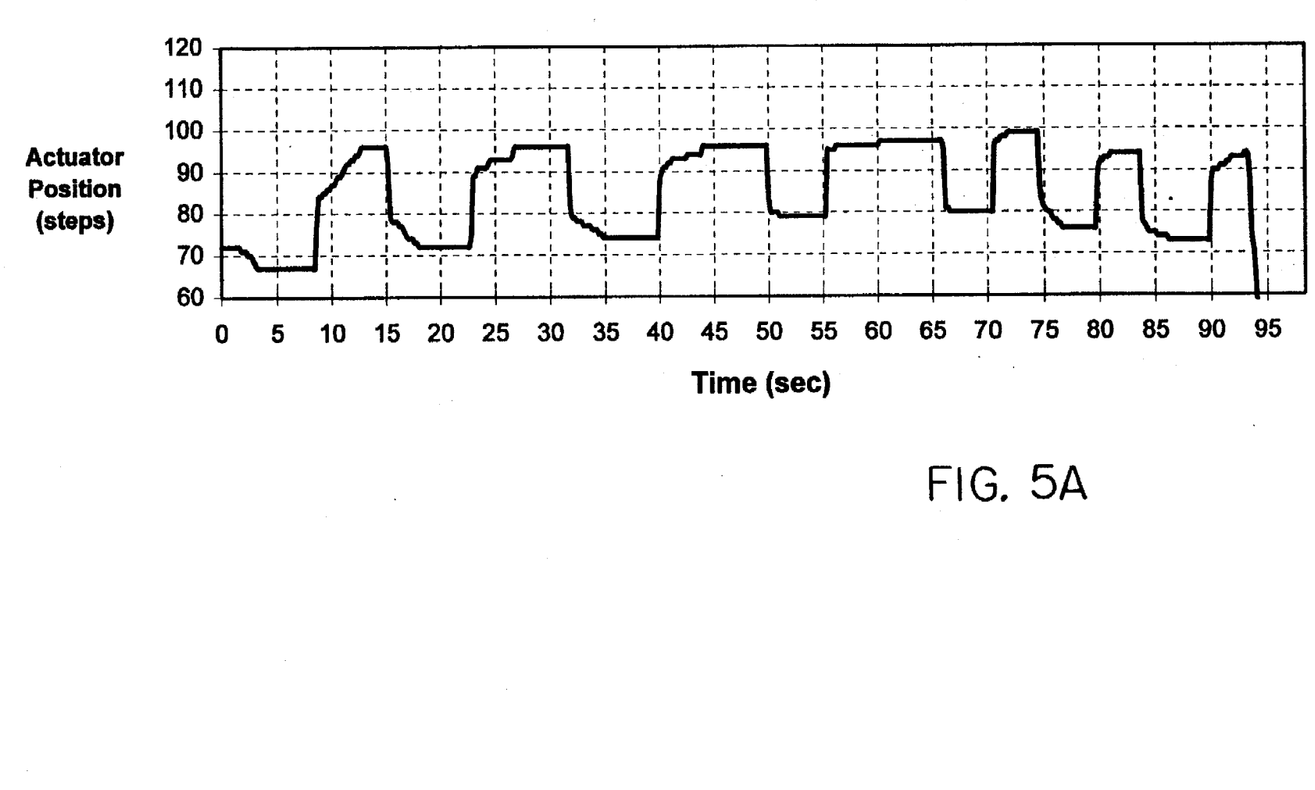
FIG. 5A, 5B and 5C show time waveforms of actuator position, throttle position and vehicle speed for the vehicle of FIG. 1 with the speed control of this invention.
Figure 5B:
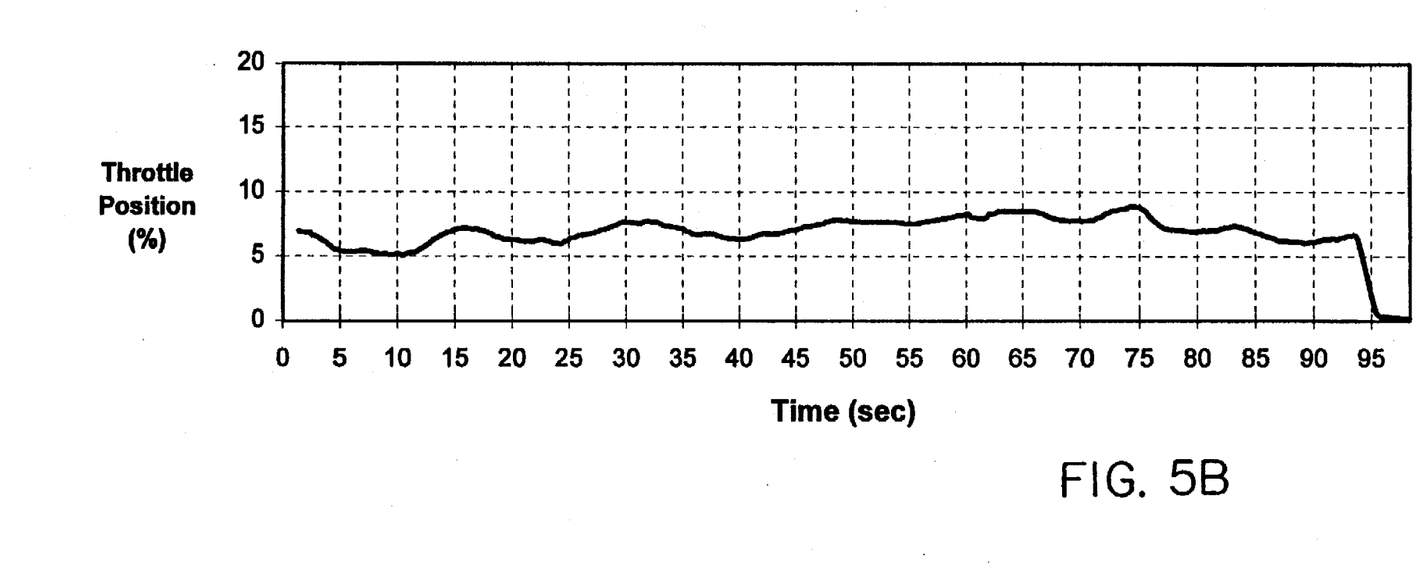
Figure 5C:
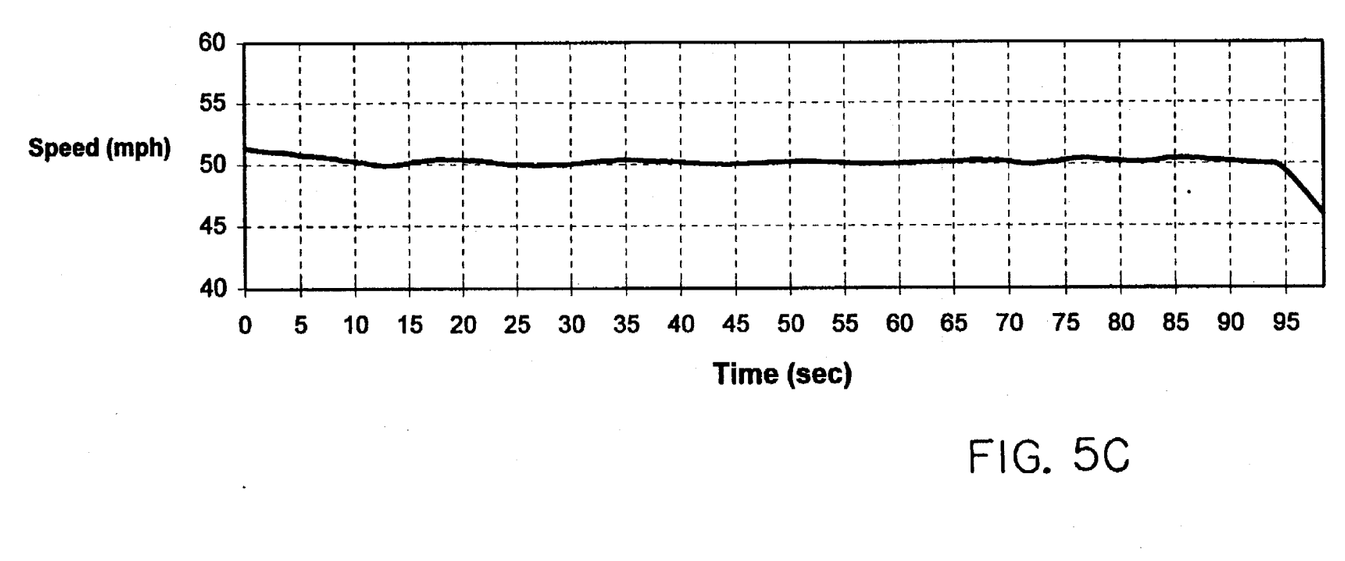

The performance of this speed control system is shown in the time plots of actuator position, throttle position and vehicle speed in FIG. 5A–5C, which may be compared with the corresponding prior art time plots of FIG. 4A–4C. The step changes due to the use of the compliance compensation value are clearly seen in FIG. 5A. These dramatic steps, however, are not seen in the throttle position plot of FIG. 5B, which shows somewhat smaller variation than that of the prior art plot in 4B. This demonstrates that the steps are successfully compensating for compliance in linking mechanism 30. Finally, the vehicle speed plot of FIG. 5C shows a virtual elimination of the speed cycling seen in FIG. 4C.

We claim:

1. A speed control system for a vehicle comprising an engine having a throttle valve, a throttle control member and a linking mechanism therebetween having compliance creating a hysteresis in movements of the throttle valve in response to movements of the throttle control member, the speed control system comprising a vehicle speed sensor, an actuator having an output linked to the throttle control member, an actuator position signal generator and a control responsive to the vehicle speed sensor and the actuator position signal generator for positioning the actuator in closed loop control with a major loop in response to vehicle speed and a minor loop in response to actuator position, the control comprising, in combination:

speed error sensing means for repeatedly determining when vehicle speed is outside a predetermined range;

actuator positioning means responsive to the speed error sensing means when the vehicle speed is outside the predetermined range for (1) deriving a desired actuator position signal, a present actuator position signal and a position error signal from the difference therebetween, (2) deriving an output position signal from the desired actuator position signal when the position error signal is not zero, (3) modifying the output position signal by a compliance compensation value for actuator movement in a first direction, and (4) activating the actuator to a position corresponding to the output position signal; and compensation update means for accumulating the second and subsequent position error signals for actuator movement in the first direction as an accumulated difference value and, when actuator movement is initiated in a second direction, updating the compliance compensation value as a predetermined percentage of the sum of the compliance compensation value and the accumulated difference value.

2. The speed control system of claim 1 in which the actuator is a stepper motor.

3. The speed control system of claim 1 in which the desired actuator position signal is modified and the position error signal accumulated only for actuator movement in the first direction.

4. The speed control system of claim 3 in which the first direction is the throttle opening direction.

5. The speed control system of claim 3 in which the first direction is the throttle closing direction.

6. The speed control system of claim 1 in which:

the compliance compensation value is a first compliance compensation value and the accumulated difference value is a first accumulated difference value;

the actuator positioning means is further effective to modify the output position signal by a second compliance compensation value for actuator movement in the second direction; and the compensation update means further accumulates the second and subsequent position error signals for actuator movement in the second direction as a second accumulated difference value and, when actuator movement is initiated in the first direction, updates the second compliance compensation value as a predetermined percentage of the sum of the second compliance compensation value and the second accumulated difference value.

7. The speed control system of claim 1 in which the compliance compensation value is the sum of at least a first number which is fixed in a non-volatile memory and a second number which is stored in a volatile memory, the updating of the compliance compensation value being based on the sum of the first and second numbers but being applied only to the second number.

* * * * *